Patented July 13, 1926.

1,592,173

UNITED STATES PATENT OFFICE.

HANS BARDT, OF SANTIAGO, CHILE.

PROCESS FOR THE REDUCTION OF NEUTRAL AND ACID METAL-SALT SOLUTION.

No Drawing. Application filed November 18, 1924, Serial No. 750,693, and in Germany March 7, 1923.

This invention has reference to a process of reduction of solutions of acid or neutral metal salts, by means of which reduction either the metals of said salts are separated out or a metal salt of a higher degree of oxidation may be converted into a metal salt of lower degrees of oxidation, while the equivalent amounts of acid may be produced at the same time.

It is well known to separate metals from their acid or neutral solutions by treating said solutions with substances containing polysaccharides at a higher temperature and under pressure. The metal, in the case of the employment of wood, saw-dust and the like is deposited upon the wood, and it naturally requires a corresponding expenditure of time and labor, in order to separate the metal from the wood or the like. The employment of wood, moreover, requires the use of correspondingly large reaction vessels for the reception of the metal salt solution to be reduced and for the reducing agent. Now, it has been ascertained that the known process may be considerably improved and simplified by proceeding in this manner that the substances containing the polysaccharides, such as wood, straw, are not employed directly as reducing agents, but causing the reagent to be produced therefrom by a preliminary treatment. This treatment consists in submitting wood, straw, peat or the like to hydrolysis by heating them in closed containers for several hours at temperatures ranging between 120 to 150 degrees C. in the presence of inorganic acids or solutions of inorganic salts. By this means solutions are obtained which are available as reducing agents and particularly adapted for metal salt solutions, and the reduction of the metal salt solution is effected by mixing the metal salt solution with the reaction product of the treatment of wood or the like with acids or salts, after separating said product from the residue, the mixture obtained being first heated to a temperature between 120 to 150 degrees C, at which temperature the reduction proper is caused to proceed, whereupon the temperature is increased to about 195 degrees C., which causes a carbonization of the extractive substances. The carbonization of the extractive substances is effected for the purpose of being able to employ the acid remaining after the separation of the metals for the dissolving of new quantities of ore. This procedure is employed in view of the fact that without the decomposition of the extractive substances the acid solutions remaining after the separation of the metal can only be employed with difficulty for the lixiviation of new quantities of ores, inasmuch as the liquors, extracts or washes under treatment upon coming in contact with basic and oxidic substances of the material to be lixiviated form a very difficultly permeable layer which prevents the admission of further quantities of acid.

The treatment of the cellulose-containing substances for the production of the reducing agent in closed vessels at a temperature of from 120 to 150 degrees C. requires several hours. In the employment of the solution thereby produced for the reduction of metal salt solutions, however, the length of time of the process is of less decisive importance than the fact that the reaction temperature of from 120 to 150 degrees C. is reached.

The utilization of the reducing agent separated from the residues of the original material under treatment is likewise of importance in the reduction particularly of metal salt solutions of higher degrees of oxidation into salts of lower degrees of oxidation, thus for example in the manufacture of copper-protochloride from solutions of copper chloride. In this case there is no necessity of a separation to be effected of the products of reduction from the wood residue and the like.

*Example.*—100 kilograms comminuted wood are mixed with 600 liters of sulphuric acid of about 0.5%, and the mixture is heated in a pressure boiler for three hours to about 132 degrs. C. The solution thereby obtained is added to 2-thousands liters of a 5% copper-sulphate solution, and both solutions are heated to 195 degrs. C. The copper is thereby precipitated in metallic, crystalline condition, and the recovered solution from which the extractive substances have been removed, may serve for the lixiviation of new quantities of metal. The invention applies particularly to non-noble metals. While I have shown and described practically but one embodiment of the invention, it should be understood that it is not restricted thereto, but that the invention is broad enough to cover various modifications and changes within the scope of the appended claims.

I claim:—

1. The process of reducing copper salt solutions, which comprises treating cellulose material with inorganic liquors in the absence of free alkali under pressure, and at temperatures approximating 120 to 150 degrees C., separating the resulting liquid from the residue and then heating copper salt solutions with such liquid at temperatures approximating 120 to 150 degrees C.

2. The process of reducing copper salt solutions, which comprises treating cellulose material with inorganic acid reacting liquor under pressure, and at temperatures averaging from 120 to 150 degrees C., and heating the resulting liquid with copper salt solutions at about the same temperature, and thereby reducing the metal salt.

3. The process of reducingly treating copper salt solutions, which comprises digesting cellulose material under pressure and at temperatures averaging from 120 to 150 degrees C. with inorganic liquors in the absence of free alkali, heating the resulting liquid with copper salt solutions at about the same temperature, and thereby reducing the copper salt, thereupon increasing the temperature to approximately 195 degrees C., thereby carbonizing the organic constituents, and recovering the resulting acid liquor.

4. The process of reducingly treating copper solutions, which comprises digesting cellulose material under pressure and at temperatures averaging from 120 to 150 degrees C. with inorganic liquors in the absence of free alkali, heating the resulting liquid with copper salt solutions at about the same temperature, thereby reducing said metal salt, thereupon heating the reducing liquor with the copper solutions to temperatures averaging 195 degrees C. thereby carbonizing the organic constituents, recovering the resulting acid liquor, separating said acid liquor, and extracting ores and metallic material with the same.

In testimony whereof I have signed this specification.

HANS BARDT.